United States Patent [19]
DiGiovanni et al.

[11] Patent Number: 5,864,644
[45] Date of Patent: Jan. 26, 1999

[54] TAPERED FIBER BUNDLES FOR COUPLING LIGHT INTO AND OUT OF CLADDING-PUMPED FIBER DEVICES

[75] Inventors: David John DiGiovanni, Essex County; Andrew John Stentz, Hunterdon County, both of N.J.

[73] Assignee: Lucent Technologies Inc., Murray Hill, N.J.

[21] Appl. No.: 897,195

[22] Filed: Jul. 21, 1997

[51] Int. Cl.⁶ .................................................. G02B 6/26
[52] U.S. Cl. .............................................. 385/43; 385/48
[58] Field of Search ................................ 385/43, 33, 48, 385/34, 123–127, 141, 142, 6; 372/69, 70, 71

[56] References Cited

U.S. PATENT DOCUMENTS

| | | | |
|---|---|---|---|
| 4,818,062 | 4/1989 | Scifres et al. ......................... | 385/43 X |
| 5,185,758 | 2/1993 | Fan et al. ................................. | 372/6 X |
| 5,268,978 | 12/1993 | Po et al. ..................................... | 385/33 |
| 5,708,669 | 1/1998 | DiGiovanni et al. ....................... | 372/6 |

*Primary Examiner*—Phan T. H. Palmer
*Attorney, Agent, or Firm*—Mathews, Collins, Shepherd & Gould, P.A.

[57] ABSTRACT

In accordance with the invention, light is coupled from a plurality of semiconductor emitters to a cladding-pumped fiber via tapered fiber bundles fusion spliced to the cladding-pumped fiber. Individual semiconductor broad stripe emitters can be coupled to individual multimode fibers. The individual fibers can be bundled together in a close-packed formation, heated to melting temperature, drawn into a taper and then fusion spliced to the cladding-pumped fiber. Advantageously, the taper is then overcoated with cladding material such as low index polymer. In addition, a fiber containing a single-mode core can be included in the fiber bundle. This single-mode core can be used to couple light into or out of the single-mode core of the cladding-pumped fiber.

12 Claims, 4 Drawing Sheets

FIG. 3A
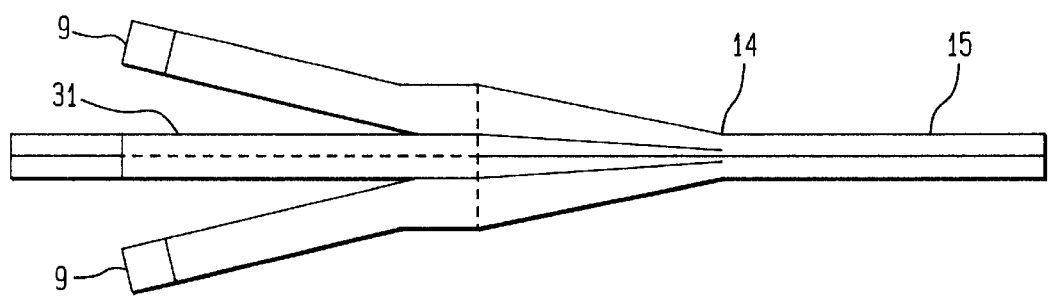
FIG. 3B        FIG. 3C        FIG. 3D        FIG. 3E
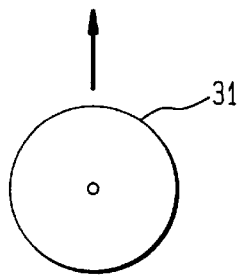 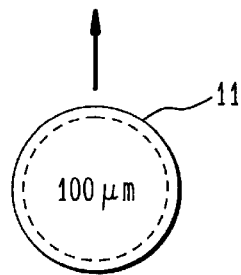 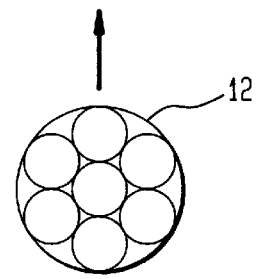 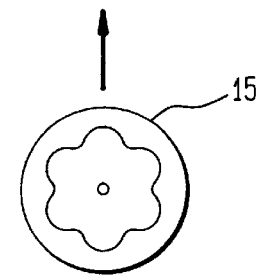

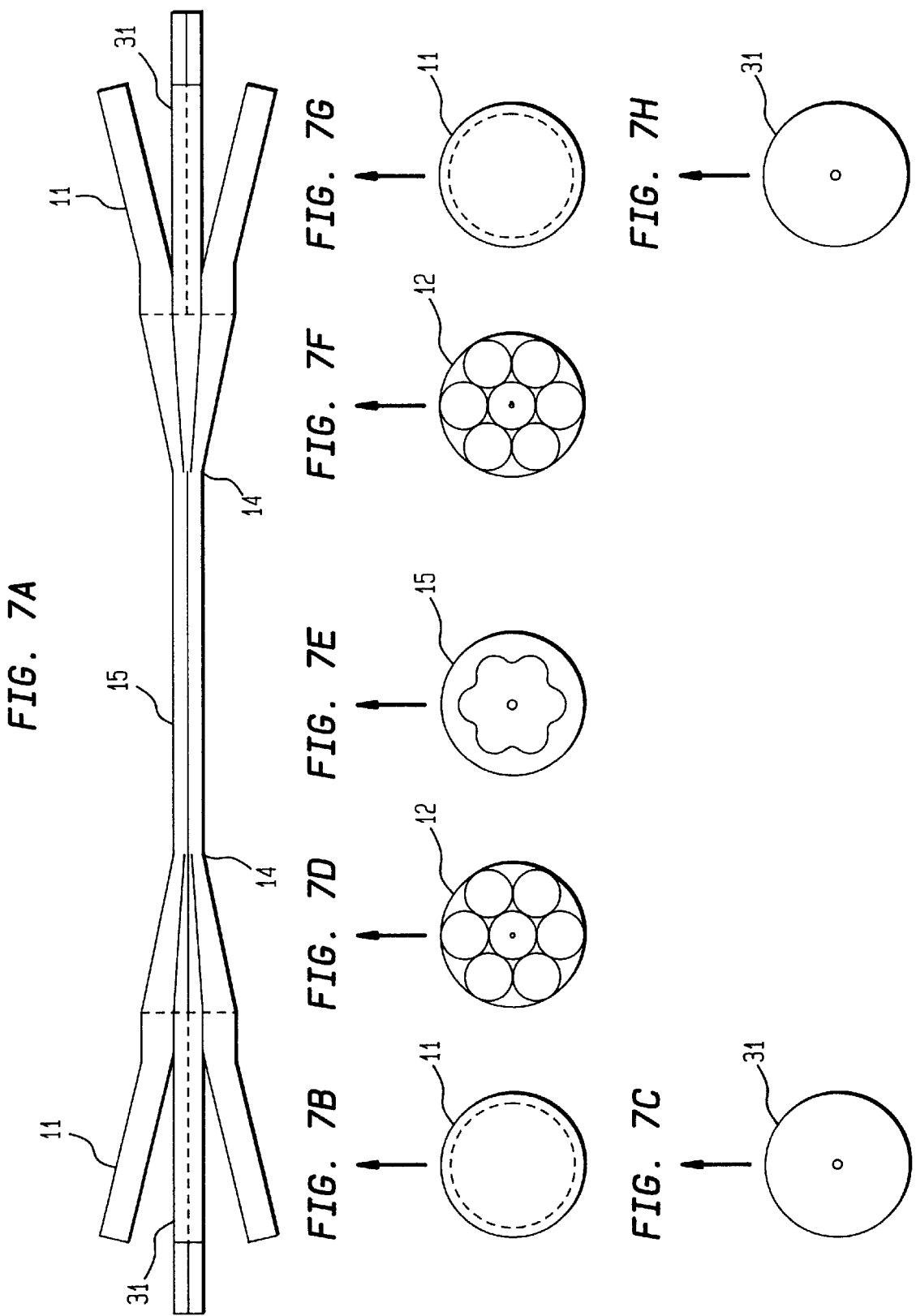

TAPERED FIBER BUNDLES FOR COUPLING LIGHT INTO AND OUT OF CLADDING-PUMPED FIBER DEVICES

FIELD OF THE INVENTION

This invention relates to tapered fiber bundles for coupling light into and out of cladding-pumped fiber devices such as lasers and amplifiers.

BACKGROUND OF THE INVENTION

Cladding-pumped fiber devices, such as lasers and amplifiers, are important in a wide variety of optical applications. In optical communications, cladding-pumped lasers they are used to pump high power Er/Yb amplifiers, to pump remotely located Er amplifiers in repeaterless communications systems and to pump Raman lasers and amplifiers. In addition cladding pumped fiber devices have promising applications as light sources for printers and in medical optics as well as materials processing.

A typical cladding-pumped fiber device comprises a single-mode core and a plurality of cladding layers. The inner cladding surrounding the core is typically a silica cladding of large cross-sectional area (as compared to the core) and high numerical aperature. It is usually non-circular (rectangular or star-shaped) to ensure that the modes of the inner cladding will have good overlap with the core. The outer cladding is commonly composed of a low refractive index polymer. The index of the core is greater than that of the inner cladding which, in turn, is greater than the outer cladding.

A major advantage of the cladding pumped fiber is that it can convert light from low-brightness sources into light of high brightness in a single mode fiber. Light from low brightness sources such as diode arrays can be coupled into the inner cladding due to its large cross-sectional area and high numerical aperature. In a cladding pumped laser or amplifier the core is doped with a rare earth such as Er. The light in the cladding interacts with the core and is absorbed by the rare-earth dopant. If an optical signal is passed through the pumped core, it will be amplified. Or if optical feedback is provided (as by providing a Bragg grating optical cavity), the cladding-pumped fiber will act as a laser oscillator at the feedback wavelength.

A difficulty preventing full exploitation of the potential of cladding-pumped fiber devices is the problem of coupling a sufficient number of low brightness sources into the inner cladding efficiently. A common approach is to couple the light from broad-stripe semiconductor lasers into multimode fibers, to bundle the fibers and then to use bulk optics to couple the light from the bundle into the cladding-pumped fiber. See, for example, U.S. Pat. No. 5,268,978. The difficulty with this approach, however, is that it requires a number of fine interfaces with associated problems of matching and alignment, as well as two sets of fiber optics. An astigmatic lens is typically disposed between the semiconductor lasers and the bundling fibers and between the bundling fibers and the fiber laser. Polishing, antireflection coatings and maintenance of precise alignments are also required. Accordingly there is a need for a new robust and compact arrangement for efficiently coupling the output of low-brightness sources into cladding-pumped fibers.

Another difficulty preventing full exploitation of the potential of cladding-pumped fiber lasers and amplifiers is the problem of coupling multimode pump light into the inner cladding while simultaneously coupling single-mode light out of or into the single-mode core. The ability to perform this function would allow one to construct bidirectionally pumped cladding-pumped fiber lasers. Pump light could be injected into the inner cladding of both ends of the cladding-pumped fiber while the single-mode fiber laser output could be extracted from the core. Additionally, simultaneous single-mode and multimode coupling to a cladding-pumped fiber would allow one to construct cladding-pumped fiber amplifiers much more efficient than conventional single-mode fiber amplifiers pumped by cladding-pumped fiber lasers. Clearly there is a need for an efficient means of simultaneously coupling multimode pump light into the inner cladding of a cladding-pumped fiber while coupling single-mode light into or out of the core.

SUMMARY OF THE INVENTION

In accordance with the invention, light is coupled from a plurality of semiconductor emitters to a cladding-pumped fiber via tapered fiber bundles fusion spliced to the cladding-pumped fiber. Individual semiconductor broad stripe emitters can be coupled to individual multimode fibers. The individual fibers can be bundled together in a close-packed formation, heated to melting temperature, drawn into a taper and then fusion spliced to the cladding-pumped fiber. Advantageously, the taper is then overcoated with cladding material such as low index polymer. In addition, a fiber containing a single-mode core can be included in the fiber bundle. This single-mode core can be used to couple light into or out of the single-mode core of the cladding-pumped fiber.

BRIEF DESCRIPTION OF THE DRAWINGS

The advantages, nature and various additional features of the invention will appear more fully upon consideration of the illustrative embodiments now to be described in detail in connection with the accompanying drawings.

FIGS. 3A–3E illustrate an alternative embodiment wherein the tapered bundle includes a single mode fiber.

FIGS. 7A–7H illustrate an alternative embodiment wherein the cladding-pumped fiber is provided with tapered bundles on both ends.

It is to be understood that these drawings are for purposes of illustrating the concepts of the invention and are not to scale.

DETAILED DESCRIPTION

Figure 1A:
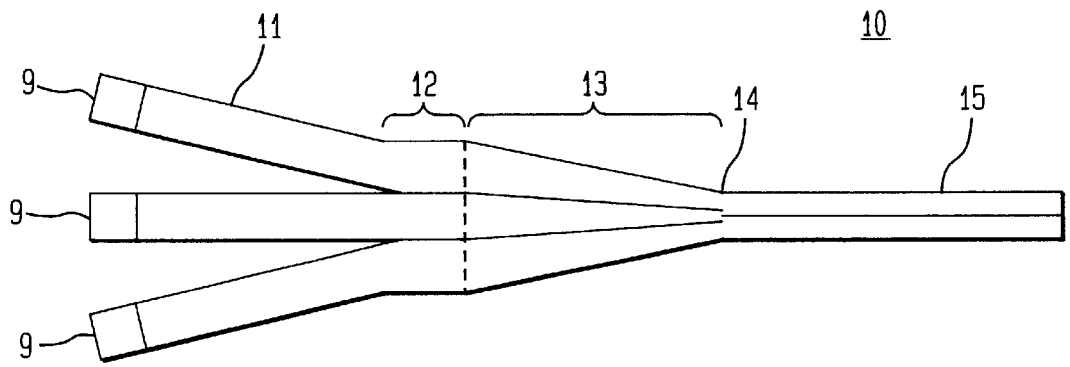
FIGS. 1A–1D schematically illustrate an arrangement using a tapered bundle of multimode fibers for pumping a cladding-pumped fiber.
Figure 1B:
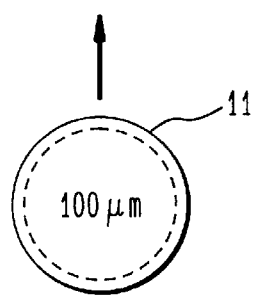
Figure 1C:
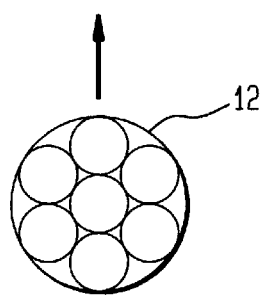
Figure 1D:
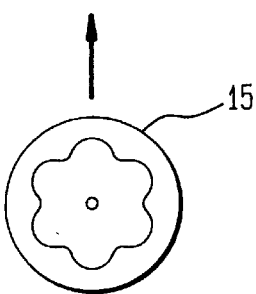

Referring to the drawings, FIGS. 1A–1D illustrate an arrangement 10 for pumping a cladding-pumped fiber comprising a plurality of individual multimode fibers 11 which converge to a bundled region 12 which extends to a tapered region 13 wherein the bundle tapers to a minimum diameter at 14 closely approximating the diameter of the cladding-pumped fiber 15. Preferably the fibers in the bundled region 12 are arranged a close-packed formation wherein the interior fibers contact the maximum number of neighboring fibers (see FIG. 1C). Ideally the bundle tapers to a cross section approximating the inner cladding of the fiber 15. It is contemplated that each individual multimode fiber 11 (of which only three are shown in FIG. 1A) will couple light from an associated semiconductor emitter source 9 to the cladding fiber 15.

Individual semiconductor broad-stripe emitters can be coupled to individual multimode fibers. The multimode fibers would typically be constructed with a pure silica core that is surrounded by a silica cladding doped with fluorine. The numerical aperture of these multimode fibers would necessarily be less than the numerical aperture of the cladding-pumped fiber. These individual fibers are then bundled together in a close-packed formation, melted and drawn into a taper, and then fusion-spliced to a cladding-pumped fiber. The tapering of the fiber bundles can be accomplished with techniques similar to those used to fabricate fused fiber couplers. Finally, the taper can be overcoated with a cladding material (e.g. a low index polymer such as fluorinated uv-cured acrylates) that gives the tapered region a numerical aperture at least as great as the cladding-pumped fiber. The cladding of the bundling fibers can be left on the fibers and incorporated into the taper if the cladding is glass. Alternately, the cladding of the bundling fibers can be removed prior to tapering.

Depending on the parameters of the cladding pumped fiber and the multimode fibers in region 12, there is a minimum cross sectional area below which region 13 should not be tapered. At lower areas losses are excessive. In general, excessive losses are avoided by maintaining the condition:

$$\left(\frac{NA\text{output}}{NA\text{input}}\right)^2 \geq \frac{\Sigma Ai}{A'},$$

where NAoutput is the numerical aperture of the output cladding pumped fiber, NAinput is the numerical aperture of an input multimode fiber, $\Sigma Ai$ is the summation of the cross-sectional areas of the fibers in region 12 and A is the area of the minimum taper diameter.

This tapered fiber bundle has numerous advantages over conventional bundling and bulk optics: no polishing or antireflection coating is required, there is no alignment of bulk optical system to be maintained, and losses are lower. In addition, as the fiber bundle is heated during the tapering process, surface tension forms the bundle into one fiber, circular or nearly circular in cross section, thereby eliminating any wasted interstitial space.

Figure 2:
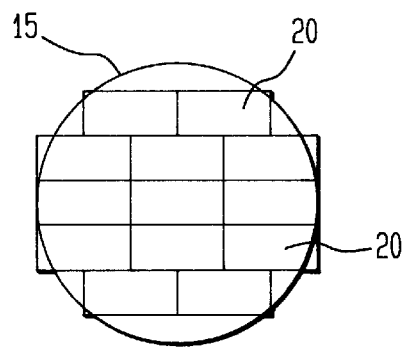
FIG. 2 illustrates an alternative embodiment using a tapered bundle of rectangular fibers.

In an alternative embodiment, the multimode fibers can be non-circular to permit packing more fibers into a given bundle. FIG. 2 depicts one scheme for packing rectangular fibers 20 for coupling to a circular cladding-pumped fiber 15.

FIGS. 3A–3E illustrate an alternative embodiment of the invention wherein at least one of the bundled tapered fibers is a single-mode fiber 31.

In this instance, all of the bundled fibers are multimode fibers except for the central fiber 31 which has a single-mode core. The core of this central fiber can be used to efficiently couple light through the taper and into or out of the core of the cladding-pumped fiber while the multimode fibers 11 are used to couple light into the cladding of the cladding-pumped fiber.

An exemplary tapered fiber bundle can be made as follows. Seven fibers are bundled together into a close-packed formation. The multimode fibers have a silica core with a diameter of 104 microns that is surrounded by a fluorinated cladding with a numerical aperture of 0.17 that brings the outer diameter of the fiber to 125 microns. The center fiber within the bundle may be a 125 micron diameter silica fiber with a single-mode, step index core that has a delta of 0.5% and a pre-tapering width of 12 microns. The bundle of fibers is melted and drawn to a final diameter of 125 microns. Due to the deformation of the fibers during the drawing process, the central fiber need only be tapered by a factor of the square root of 7 (i.e. 2.646) in order for the bundle to melt into a 125 micron diameter cylinder. The heating of the fibers can be accomplished using a variety of approaches including a direct flame, a baffled flame an electric furnace, a plasma or a $CO_2$ laser. The ends of the fiber are rigidly mounted to translation stages that are translated at different speeds in order to create the taper. The tapered end of the bundle may then be cleaved, fusion spliced to a cladding pumped fiber with a numerical aperture of 0.45 and then overcoated with a low-index polymer.

Figure 4:
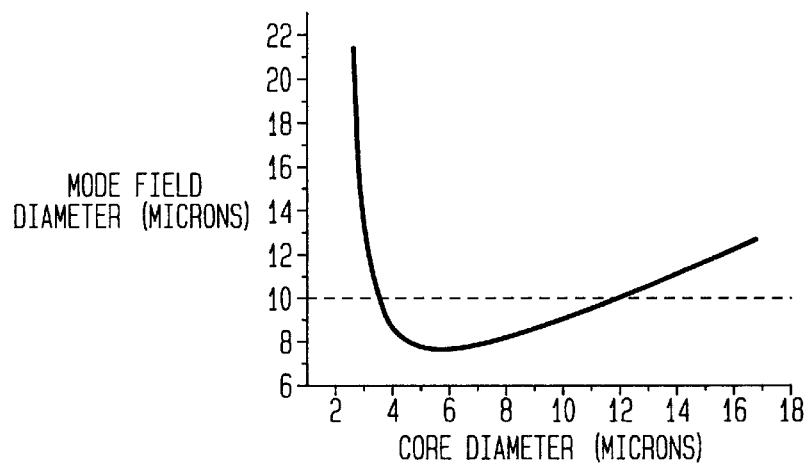
FIGS. 4, 5 and 6 are graphical illustrations useful in the design of an exemplary device as illustrated in FIG. 3.
Figure 5:
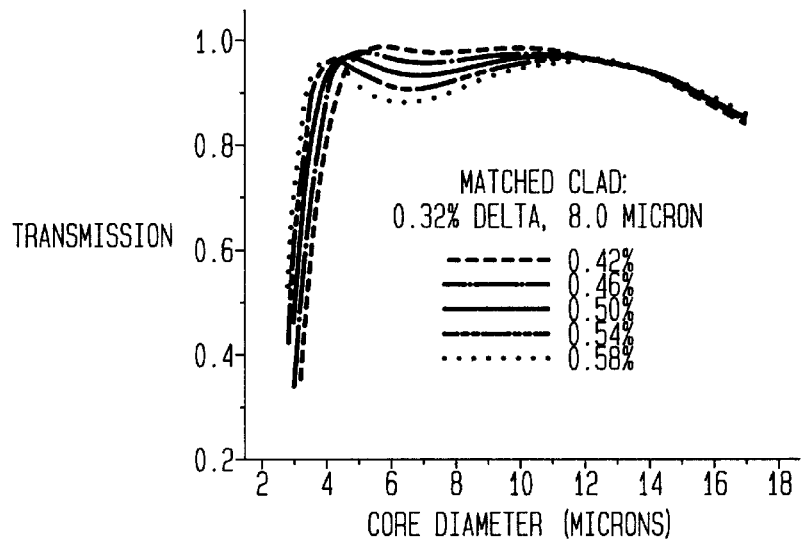
Figure 6:
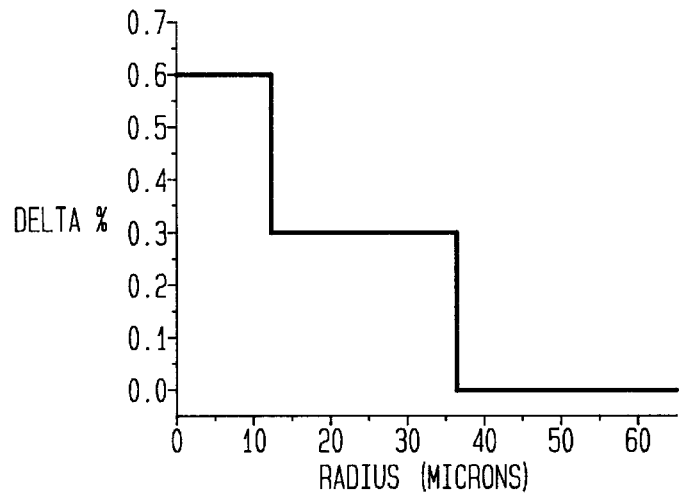

It is important that the single-mode core of the central fiber within the taper be capable of fusion splicing with low loss to standard single-mode fibers on both its tapered and untapered ends. In order to understand how this can be accomplished, consider the plot of the mode-field diameter of a step-index fiber as a function of core diameter shown in FIG. 4. For a given delta, there is a core diameter at which the mode field diameter is at its minimum. For a given degree of tapering and input and output fibers, one can design a tapering fiber such that the mode will have good overlap with the input fiber before tapering and with the output fiber after tapering as depicted in FIG. 4. For example, if one wishes to decrease the diameter of the central fiber by a factor of three in the tapered region, and one wishes to splice onto a standard step index fiber with a delta of 0.32% and a core diameter of 8 microns at a wavelength of 1.55 microns at both the input and output of the taper, the numerical modeling results shown in FIG. 5 indicate that a tapering fiber with a delta of 0.5% and an initial core diameter of 12 microns yields low splice loss at both the input and output ends. In this example, the tapering fiber remains singe-moded throughout the taper region. Additionally, index profiles such as that shown in FIG. 6 can be used to extend the technique to larger tapering ratios although the fiber will typically be multimoded at the untapered end.

FIGS. 7A–7H show yet a third embodiment of the invention wherein bundled tapered fibers couple light into both ends of a cladding-pumped fiber. In this instance the central fibers 31 are single mode, and the structure forms a cladding-pumped fiber amplifier.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

What is claimed:

1. A cladding pumped optical fiber device comprising:
   a length of cladding pumped fiber;
   a plurality of optical sources for optically pumping said cladding pumped fiber; and
   a plurality of multimode fibers optically coupling said optical sources to said cladding pumped fiber, each multimode fiber having a first end coupled to an optical source and a second end coupled to said cladding pumped fiber for coupling multimode light into said cladding pumped fiber, a single mode fiber coupled to said cladding pumped fiber for coupling single mode light, said plurality of multimode fibers and said single mode fiber bundled together in a region intermediate the first and second ends and said bundle tapered to a reduced cross sectional region at the second ends.

2. The device of claim 1 wherein said cladding pumped fiber includes a rare-earth doped core.

3. The device of claim 2 wherein said cladding pumped fiber is an optical amplifier.

4. The device of claim 2 wherein said cladding pumped fiber is a fiber laser.

5. The device of claim 1 wherein said cladding pumped fiber has a first cross sectional area and said bundle is tapered to a cross sectional area less than or equal to said first cross sectional area.

6. The device of claim 1 wherein said reduced cross sectional region is fusion spliced to said cladding pumped fiber.

7. The device of claim 1 wherein said fibers are bundled in a close packed formation.

8. The device of claim 1 wherein said rare-earth doped cladding pumped fiber includes an optical feedback cavity.

9. The device of claim 1 wherein said cladding pumped fiber has a pair of ends, each end of said cladding pumped fiber is coupled to the tapered end of a respective bundle of fibers, and at least one bundle of fibers includes a single mode fiber.

10. A tapered fiber bundle comprising:

a length of cladding pumped fiber;

a plurality of multimode fibers and a single mode fiber bundled together, said bundle tapered to a reduced cross sectional region, and said reduced cross sectional region fusion spliced to said cladding pumped fiber.

11. The fiber bundle of claim 10 wherein said cladding pumped fiber includes a rare-earth doped core.

12. The fiber bundle of claim 11 wherein said cladding pumped fiber includes an optical feedback cavity.

* * * * *